United States Patent Office 3,326,457
Patented June 20, 1967

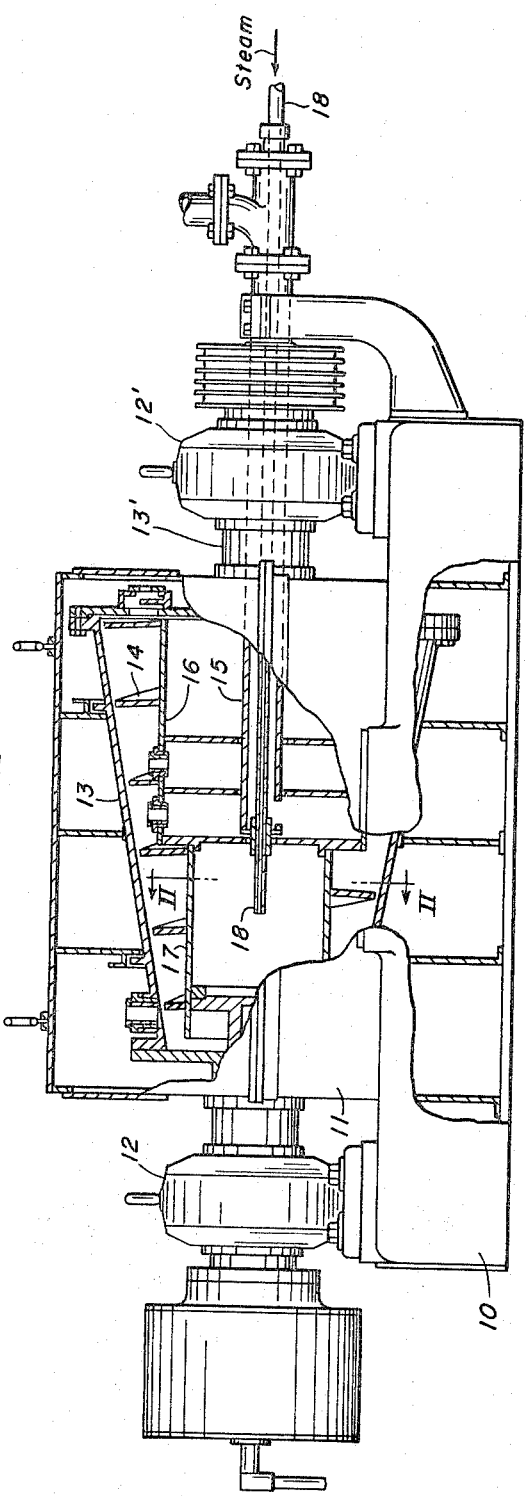
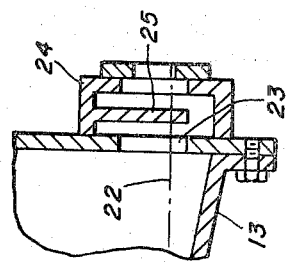
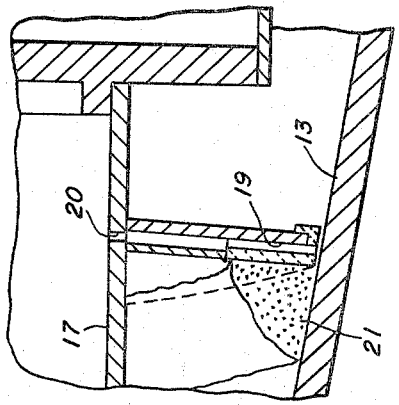
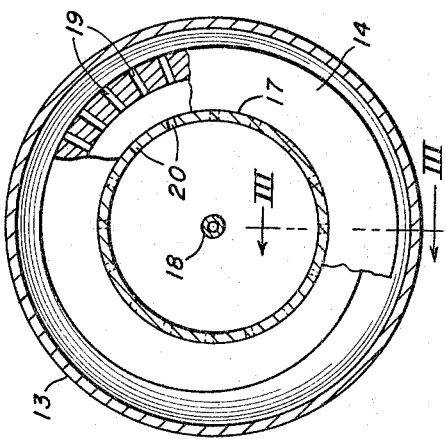
INVENTOR.
WILLIAM L. McMORRIS, JR.
By Donald G. Dalton
Attorney

3,326,457
METHOD AND APPARATUS FOR STEAM-ASSISTED CENTRIFUGAL DEWATERING
William L. McMorris, Jr., Pittsburgh, Pa., assignor to United States Steel Corporation, a corporation of Delaware
Filed Feb. 14, 1964, Ser. No. 344,898
2 Claims. (Cl. 233—7)

This invention relates generally to the separation of solids from liquids, e.g., fine coal from water, and, in particular, to centrifugal separation thereof in which steam is directed onto the mixture of solids and liquid to release the latter from the former.

It is known that the application of steam to a filter cake formed, for example, on the porous member of a suction or vacuum filter, facilitates the escape of liquid therefrom and permits the collection of a drier solid. It is the object of my invention to achieve this same advantage in connection with a centrifugal filter of known type, by modifying the construction thereof.

In a preferred embodiment, I provide a conventional centrifugal filter comprising a conical frustum or bowl rotating about its axis (disposed horizontally) and a tapering conveyor screw nested therein rotating at a slightly lower speed (as an example, the filter made by Bird Machine Co., South Walpole, Mass.), with a steam chest, a pipe for admitting steam thereto from an external source, and radial passages in the screw, spaced circumferentially thereof, extending from the chest to the periphery of the screw. By this construction, steam is directed under the helical ribbon of solid material which is progressively pushed up the slope of the conical frustum or bowl by successive turns of the conveyor screw. It will be noted that the steam is not introduced into the main body of the effluent but only under the ribbon of solid material after separation therefrom of most of the liquid initially present in the mixture.

A complete understanding of the invention may be obtained from the following detailed description and explanation which refer to the accompanying drawings illustrating the present preferred embodiment. In the drawings:

FIGURE 1 is an elevation, partly broken out and in vertical section, showing a Bird centrifugal filter with the modification involved by my invention;

FIGURE 2 is a transverse section through the conveyor screw thereof taken along the plane of line II—II of FIGURE 1;

FIGURE 3 is a partial section through the flight taken along the plane of line III—III of FIGURE 2; and FIGURE 4 shows to enlarged scale a part of the conical filter bowl appearing in FIGURE 1.

Referring now in detail to the drawings, a Bird centrifugal solid-bowl filter comprises a base 10 and a housing 11 upstanding thereon with bearings 12 and 12' at the ends of the housing for rotatably supporting a frustoconical bowl 13 in the housing and a tapering conveyor screw 14 nested coaxially in the bowl. A feed-inlet pipe 15 extends through a hollow journal 13' rotatable in bearing 12', on which bowl 13 is mounted, into a cylindrical feed box 16 rotatably mounted in the journal. Screw 14 extends around and is secured to box 16 and an extension 17 thereof which is of reduced diameter. The structure so far described is commercially available and further details are shown and explained in "Bird Filter Manual," a publication of the Bird Machine Co. aforementioned.

According to my invention, I employ the extension 17 as a steam chest and supply steam thereto, from any convenient source, at suitable temperature and pressure, through a supply pipe 18 extending through feed-inlet pipe 15. Screw 14 has a plurality of circumferentially spaced radial passages 19 cored in the hard-metal facing on its periphery. The inner portion of the screw is of double-wall construction as shown in FIGURE 3 and the space between the walls communicates with passages 19. Holes 20 in the cylindrical wall of chest 17 admit steam to said space from which it flows through passages 19 and is discharged against the wall of bowl 13 adjacent the ribbon 21 of solid material being pushed up the slope of the bowl wall by the flight. Chest 17 and pipe 18 are preferably provided with thermal insulation (not shown).

By virtue of the construction described immediately above, the solid material, after separation from the greater part of the liquid initially present in the original mixture of liquid and solid, is subjected to the action of live steam. As is well known, the resulting heating effect reduces the viscosity and surface tension of the liquid remaining trapped in the fine particles of solid material so that it is freed therefrom and flows to the larger end of bowl 13 where it collects with liquid previously separated, in an annular pool the surface of which is indicated at 22.

FIGURE 4 shows one of the effluent outlets 23 at the large end of bowl 13, provided with a covering cup 24 containing a baffle plate 25. The outlets are thus afforded a steam trap which prevents loss of steam therethrough.

It will be evident from the foregoing that I am able to maintain steam in chest 17 under suitable pressure, i.e., slightly above atmospheric, so as to heat by condensation the separated solid material pushed along the bowl by the conveyor flight, thus freeing from it further liquid content and increasing the dryness of the solids finally collected. The advantage of the invention is that it combines with the high throughput of a centrifugal filter the increased effectiveness of steam-assisted dewatering which has been demonstrated on vacuum filters utilizing a traveling porous belt. The overall result is a substantial reduction in the liquid content of the separated solids, with good economy in the consumption of steam.

Although I have disclosed herein the preferred embodiment of my invention, I intend to cover as well any change or modification therein which may be made without departing from the spirit and scope of the invention.

I claim:
1. In a filtering apparatus including a horizontal frustoconical bowl mounted for rotation on its longitudinal axis and a tapering conveyor screw nested coaxially within said bowl and rotatable relative thereto, effective to scrape along the bowl a helical ribbon of separated solid material, the combination therewith of a steam chest within said screw, and a steam-supply pipe extending into said chest axially of said bowl and screw, said screw having generally radial passages therein extending from said chest to the periphery of the screw, whereby steam from said chest is discharged under said helical ribbon of separated solid material.
2. Apparatus as defined in claim 1, characterized by said bowl having effluent outlets in its larger end, cups overlying said outlets and baffle plates therein effective to trap steam in the bowl while permitting the outflow of liquid.

References Cited

UNITED STATES PATENTS

| | | | |
|---|---|---|---|
| 581,354 | 4/1897 | Lapp | 233—7 |
| 992,876 | 5/1911 | Jones | 233—7 |
| 1,064,184 | 6/1913 | Wels | 233—7 |
| 2,308,559 | 1/1943 | Winkler | 233—7 X |
| 2,685,369 | 8/1954 | Crossley | 233—14 X |

FOREIGN PATENTS 973,004  12/1954  Germany.

M. CARY NELSON, *Primary Examiner.*

HENRY T. KLINKSIEK, *Assistant Examiner.*